(12) United States Patent
Bogart et al.

(10) Patent No.: US 7,063,280 B1
(45) Date of Patent: Jun. 20, 2006

(54) BROADCAST SPREADER WITH A DIRECTIONAL CONTROL ASSEMBLY

(75) Inventors: Bruce E. Bogart, Georgetown, IN (US); Steven H. Taylor, Crestwood, KY (US)

(73) Assignee: Brinly-Hardy Company, Jeffersonville, IN (US)

( * ) Notice: Subject to any disclaimer, the term of this patent is extended or adjusted under 35 U.S.C. 154(b) by 34 days.

(21) Appl. No.: 10/971,420

(22) Filed: Oct. 22, 2004

Related U.S. Application Data

(60) Provisional application No. 60/558,389, filed on Apr. 1, 2004.

(51) Int. Cl.
*A01C 17/00* (2006.01)

(52) U.S. Cl. .................. 239/687; 239/505; 239/578; 239/681; 239/686

(58) Field of Classification Search ................ 239/505, 239/513, 569, 578, 650, 665, 681, 686, 687
See application file for complete search history.

(56) References Cited

U.S. PATENT DOCUMENTS

| | | | |
|---|---|---|---|
| 3,383,055 A | 5/1968 | Speicher | |
| 3,682,395 A | 8/1972 | van der Lely et al. | |
| 3,817,408 A | 6/1974 | Hanson | |
| 4,106,703 A | 8/1978 | Magda | |
| 4,166,581 A * | 9/1979 | Hetrick | ........................ 239/687 |
| 4,401,266 A | 8/1983 | Funkhouser | |
| 4,469,210 A | 9/1984 | Blumer et al. | |
| 4,548,362 A * | 10/1985 | Doering | ........................ 239/687 |
| 4,588,133 A * | 5/1986 | Brabb et al. | ................. 239/681 |
| 4,681,265 A | 7/1987 | Brabb et al. | |
| 4,867,381 A | 9/1989 | Speicher | |
| 4,991,781 A * | 2/1991 | Barbieri | ........................ 239/681 |
| 5,340,033 A * | 8/1994 | Whitell | ........................ 239/681 |
| 5,370,321 A | 12/1994 | Bianco | |
| 6,047,909 A | 4/2000 | Simpson | |
| 6,209,808 B1 | 4/2001 | Anderson | |
| 6,499,679 B1 | 12/2002 | Woodruff et al. | |
| 6,616,074 B1 | 9/2003 | Courtney et al. | |
| 2002/0014545 A1 | 2/2002 | Woodruff et al. | |
| 2003/0192968 A1 | 10/2003 | Courtney et al. | |

FOREIGN PATENT DOCUMENTS

WO     WO 02/087310     11/2002

* cited by examiner

*Primary Examiner*—Steven J. Ganey
(74) *Attorney, Agent, or Firm*—Stites & Harbison, PLLC; David W. Nagle, Jr.

(57) ABSTRACT

A broadcast spreader includes a directional control assembly that defines a pathway for granular material from the hopper to a rotating fan, resulting in the distribution of the granular material in a predetermined distribution pattern, wherein rotation of a first (or rotating) plate of the directional control assembly relative to the hopper causes a clockwise or counterclockwise shifting of the pathway for the granular material, thus altering the direction of the predetermined distribution pattern. Furthermore, the directional assembly includes a second (or shutter) plate that is secured to the first plate, the slidable movement of the second plate relative to the first plate regulating flow of granular material from the hopper to the fan.

13 Claims, 8 Drawing Sheets

BROADCAST SPREADER WITH A DIRECTIONAL CONTROL ASSEMBLY

CROSS-REFERENCE TO RELATED APPLICATIONS

The present application claims priority to U.S. Provisional Application Ser. No. 60/558,389 filed Apr. 1, 2004, the entire disclosure of which is incorporated herein by reference.

BACKGROUND OF THE INVENTION

The present invention relates to a broadcast spreader, and, more particularly, to a broadcast spreader with a directional control assembly.

A broadcast spreader is commonly used to distribute granular materials, such as seed, fertilizers, or salts to a lawn, field, pasture, or similar surface. A broadcast spreader is generally comprised of a hopper mounted on wheels with a means for attaching the broadcast spreader to a tractor, truck, riding mower, or other vehicle. The broadcast spreader is thus towed behind the tractor, truck, riding mower, or other vehicle to distribute granular materials over the lawn, field, pasture, or similar surface. Alternatively, the hopper may be mounted to a vehicle, such as an all-terrain vehicle (ATV) for distributing the granular materials.

In any event, the hopper has a discharge port in a lower portion thereof, with the granular material passing through this discharge port under the force of gravity, where the material is then distributed onto a rotating fan which propels the material onto the lawn, field, pasture, or similar surface. The flow of material, i.e., the amount distributed onto the rotating fan, is commonly controlled by a shutter. The shutter can be selectively positioned relative to the discharge port to regulate the flow of material. In any event, such a construction for a broadcast spreader is well-known and understood by one of ordinary skill in the art. For example, U.S. Patent Publication No. 2002/0162907, which is incorporated herein by reference, provides a detailed list of prior art references that describe the construction of a common broadcast spreader.

However, it is recognized that different types of material and/or different speeds of travel have the undesirable effect of skewing the direction the material is thrown to one side or the other. For example, at the same speed of travel, a heavy fertilizer will spread differently than a light grass seed. Some broadcast spreaders have an adjustment to center the distribution pattern by adjusting the flow of material so that the material strikes the fan in various locations. The downside to such an approach is the deterioration of the uniformity of particle distribution in a given pattern that can lead to streaking or other undesirable effects.

There is thus a need for a broadcast spreader with directional control, allowing the operator to adjust the direction of the distribution pattern, but without adversely affecting the distribution pattern. Although the effort of the operator will often be to center the distribution pattern, the desired broadcast spreader would also preferably allow for the shifting of and concentration of the distribution pattern to one side, as would be necessary to prevent needless distribution of a material on an adjacent area, such as a sidewalk or flowerbed.

SUMMARY OF THE INVENTION

The present invention is a broadcast spreader with a directional control assembly, which, in one exemplary embodiment, includes an upper plate that is secured to the underside of the hopper of the broadcast spreader, an intermediate (or rotating) plate that is secured to and adapted for rotation with respect to the upper plate, and a lower (or shutter) plate that is secured to and adapted for slidable movement with respect to the intermediate plate.

In such an exemplary embodiment, there is an arc-shaped opening defined through the upper plate which is substantially in registry with the discharge port defined through the hopper when the directional control assembly is assembled and secured to the hopper. There is also an arc-shaped opening defined through the intermediate plate which is substantially in registry with the opening defined through the upper plate; however, this opening is an approximately 90° arc, as compared to the 180° arc of the opening defined through the upper plate.

When assembled, the intermediate plate is positioned adjacent the bottom surface of the upper plate and adapted for rotation with respect to the upper plate. Furthermore, the lower plate is secured to the bottom surface of the intermediate plate for slidable movement with respect to the intermediate plate. In this position, the lower plate rotates with the intermediate plate. However, this lower plate can also be independently advanced forwardly and rearwardly to act as a shutter, opening and closing the pathway from the discharge port of the hopper to the rotating fan, and thus regulating the flow of material.

In any event, as the intermediate plate (and lower plate) is rotated relative to the upper plate and the hopper, granular material continues to contact the same annular "band" on the rotating fan, but that the annular band is shifted from side to side, i.e., it is rotated clockwise or counterclockwise. Accordingly, the direction of the distribution pattern can be altered without changing the rate of flow of material from the hopper or otherwise adversely affecting the distribution pattern. By allowing for such directional control, an operator can make adjustments to account for the speed of the tractor and/or other factors that may affect the distribution pattern.

In an alternate embodiment, the directional control assembly includes only the intermediate plate and the lower plate, with the intermediate plate being directly secured to the underside of the hopper in registry with the discharge port and in a manner that allows for the rotation of the intermediate plate relative to the hopper, thus eliminating the need for the above-described upper plate.

DETAILED DESCRIPTION OF THE INVENTION

The present invention is a broadcast spreader with a directional control assembly.

Figure 1:
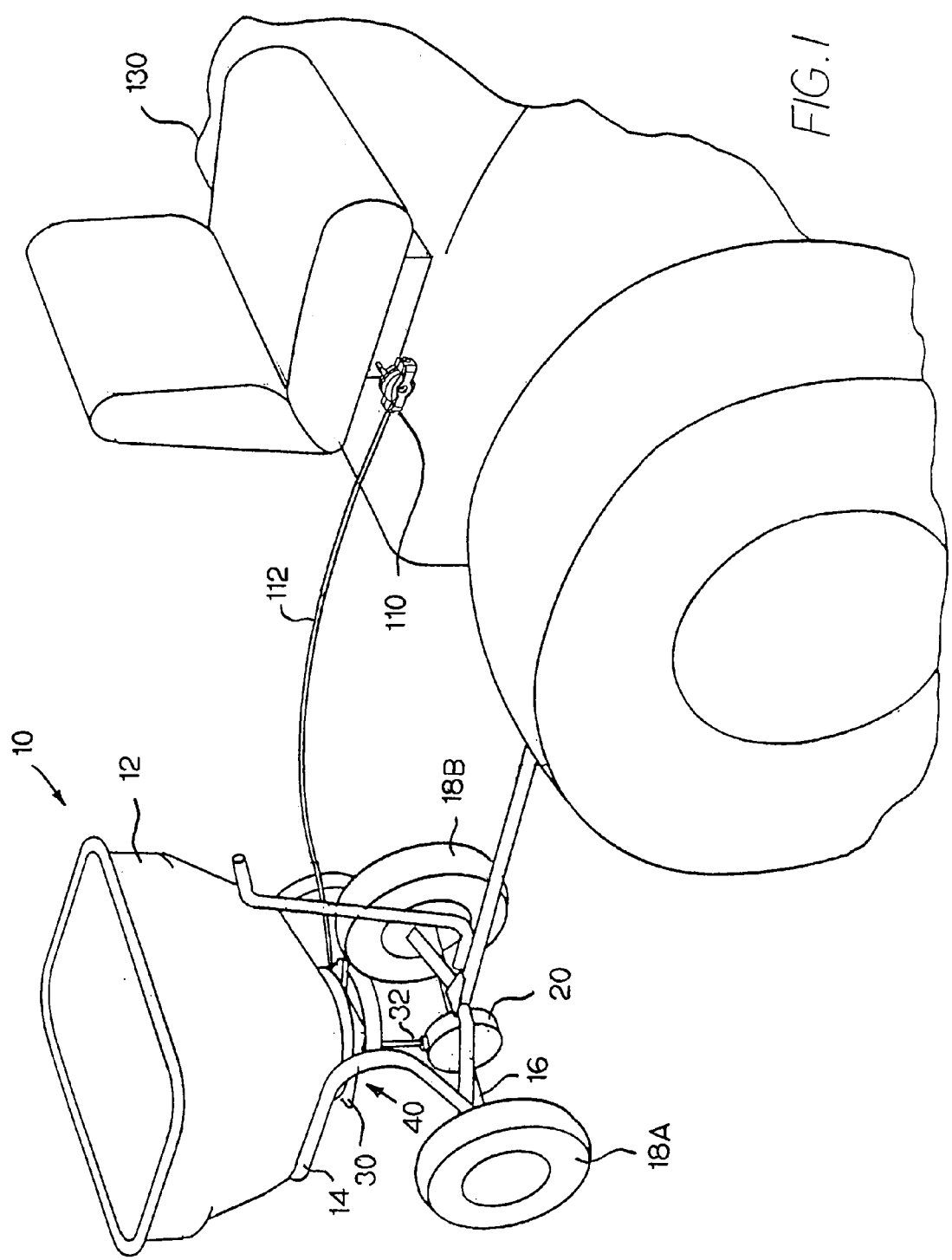
FIG. 1 is a perspective view of an exemplary broadcast spreader made in accordance with the present invention secured to and being towed behind a tractor.

FIG. 1 is a perspective view of an exemplary broadcast spreader 10 made in accordance with the present invention secured to and being towed behind a tractor 130. The broadcast spreader 10 generally includes a hopper 12 that is mounted on a support frame 14. An axle 16 extends through a lower portion of this support frame 14, with wheels 18A, 18B being mounted on either end of the axle 16. Like most broadcast spreaders, this exemplary broadcast spreader 10 includes a discharge port (not shown) defined through a bottom surface of the hopper 12, with the granular material stored in the hopper 12 passing through this discharge port under the force of gravity and then being distributed onto a rotating fan 30 which propels the material onto a lawn, field, pasture, or similar surface. In this exemplary embodiment, the broadcast spreader 10 utilizes the movement of the wheels 18A, 18B to drive the rotating fan 30. Specifically, rotation of the fan 30 is achieved through use of a transmission 20 that couples the axle 16 of the wheels 18A, 18B of the broadcast spreader 10 to a shaft 32 that drives the fan 30. Of course, for broadcast spreaders that are mounted to a vehicle, such as an ATV, since there are no wheels to drive the fan, a motor is often used to drive the fan.

Figure 2:
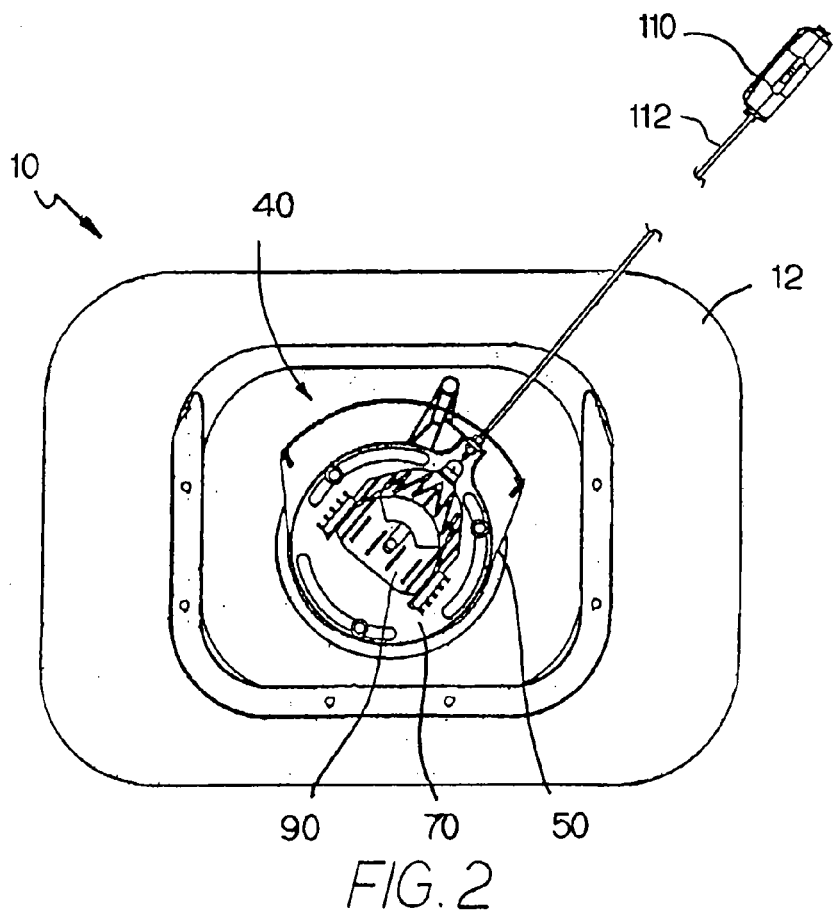
FIG. 2 is a bottom view of the exemplary broadcast spreader of FIG. 1, illustrating the directional control assembly.

In any event, and as mentioned above, the focus of the present invention is on a directional control function, allowing the operator to shift the distribution pattern from side to side, but without adversely affecting the distribution pattern. Referring now to FIG. 2, the directional (or centering) control assembly 40 is secured to the underside of the hopper 12 of the broadcast spreader 10 and in registry with the discharge port.

Figure 3:
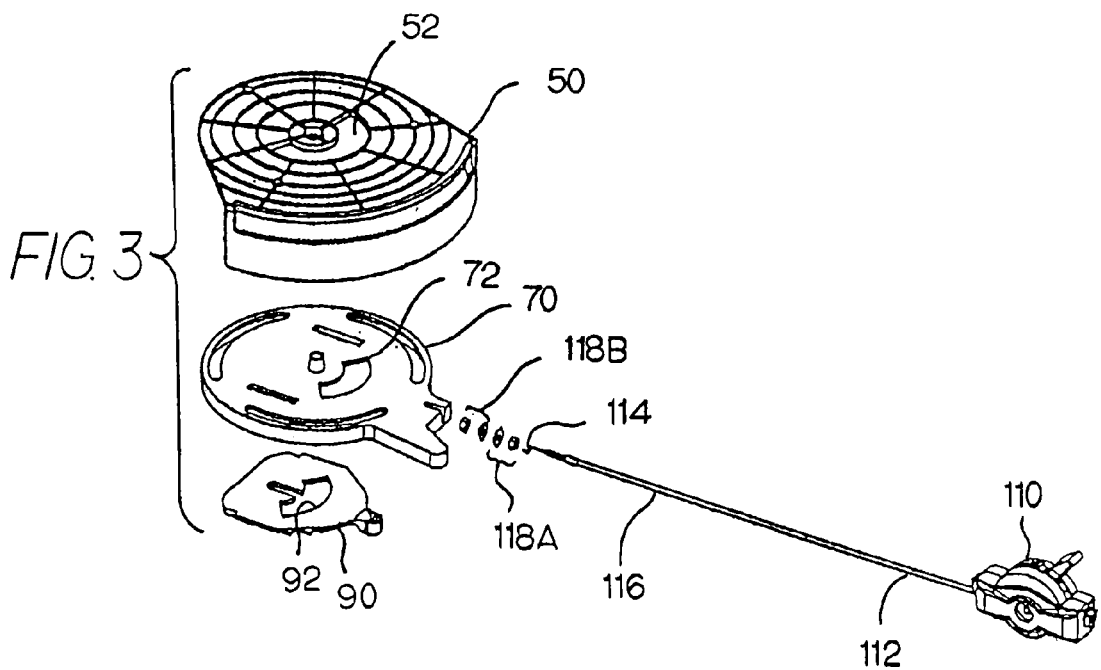
FIG. 3 is an exploded perspective view of the directional control assembly of the exemplary broadcast spreader of FIG. 1.
Figure 4:
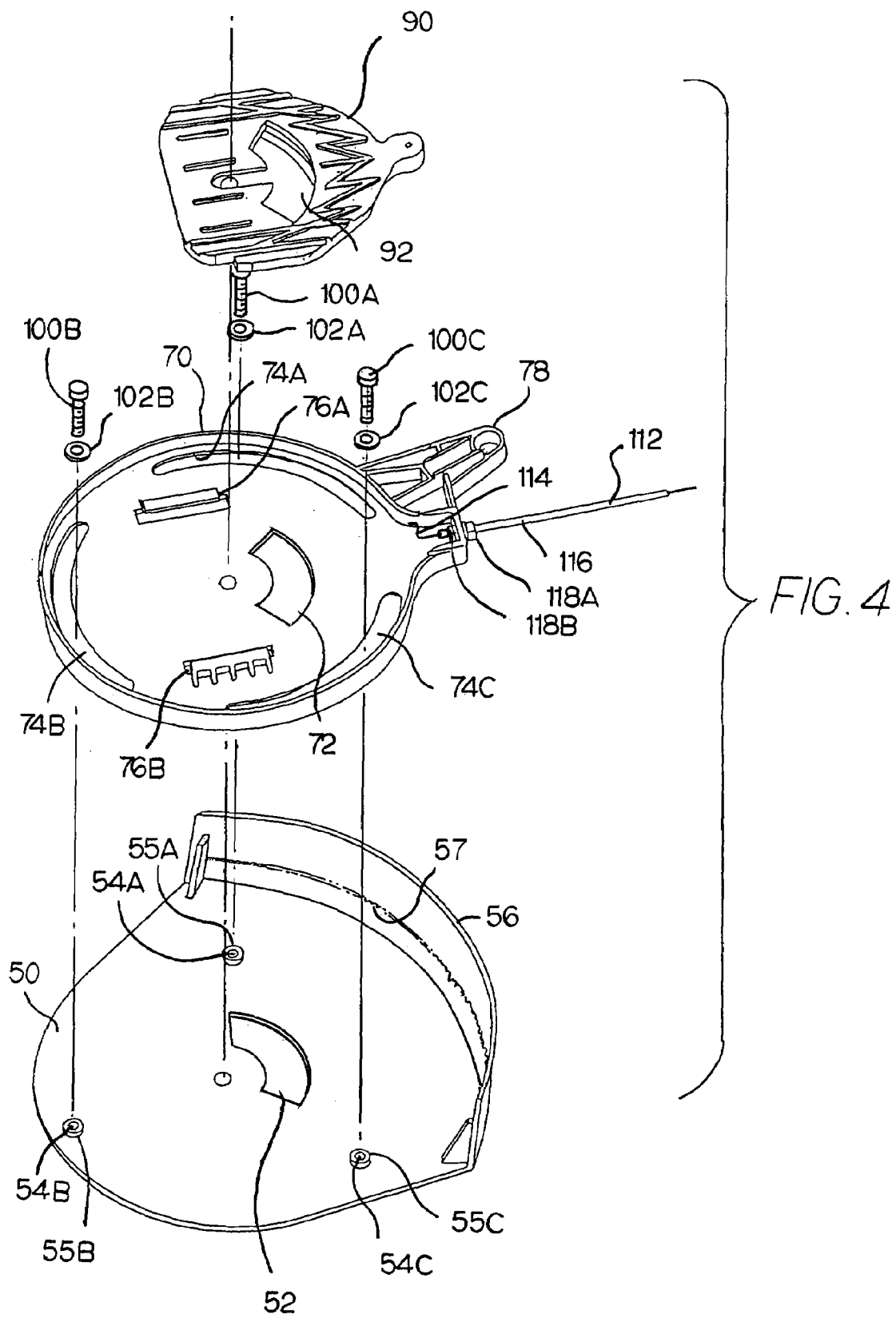
FIG. 4 is an alternate exploded perspective view of the directional control assembly of the exemplary broadcast spreader of FIG. 1.

FIGS. 3 and 4 provide further views of the exemplary directional control assembly 40, illustrating the components of this exemplary directional control assembly 40—an upper plate 50 that is secured to the underside of the hopper 12 (as shown in FIG. 2), an intermediate (or rotating) plate 70 that is secured to and adapted for rotation with respect to the upper plate 50, and a lower (or shutter) plate 90 that is secured to and adapted for slidable movement with respect to the intermediate plate 70.

Figure 5:
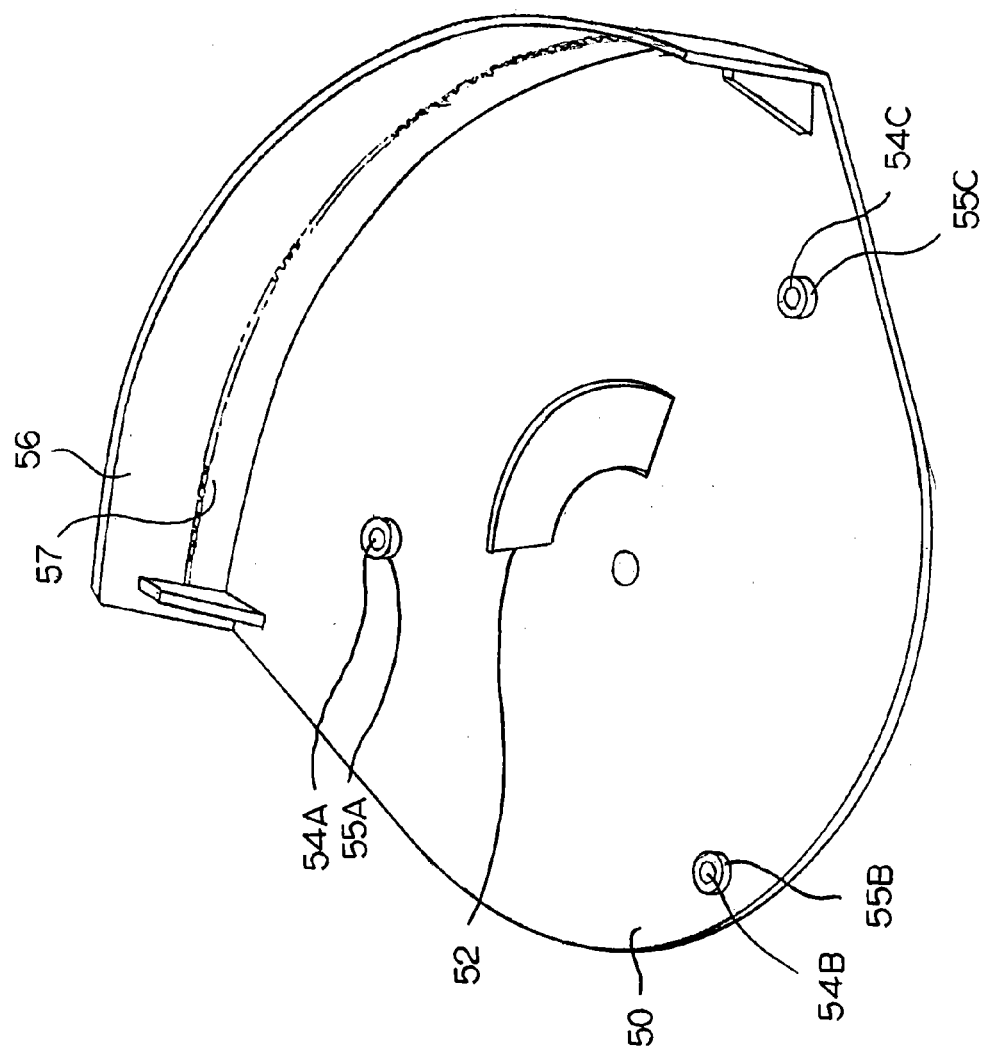
FIG. 5 is a perspective view of the upper plate of the directional control assembly of FIGS. 2–4.

FIG. 5 is a perspective view of the upper plate 50 of the directional control assembly 40. As shown, there is an arc-shaped opening 52 defined through the upper plate 50 which is in registry with the discharge port defined through the hopper 12 when the directional control assembly 40 is assembled and secured to the hopper 12 (as shown in FIGS. 1 and 2). In this regard, in this exemplary embodiment, there are three holes 54A, 54B, 54C through the upper plate 50 at spaced intervals along the periphery of the upper plate 50, each of which is designed to receive a screw or similar fastener for securing the upper plate 50 to the underside of the hopper 12 (as shown in FIGS. 1 and 2 and further described below). Furthermore, there are bosses 55A, 55B, 55C extending from the bottom surface of the upper plate 50 that are in registry with the holes 54A, 54B, 54C. Finally, the upper plate 50 includes a downwardly extending deflector 56 along a portion of its front edge that includes an opening defined therethrough 57, the importance of which will be further described below.

Figure 6:
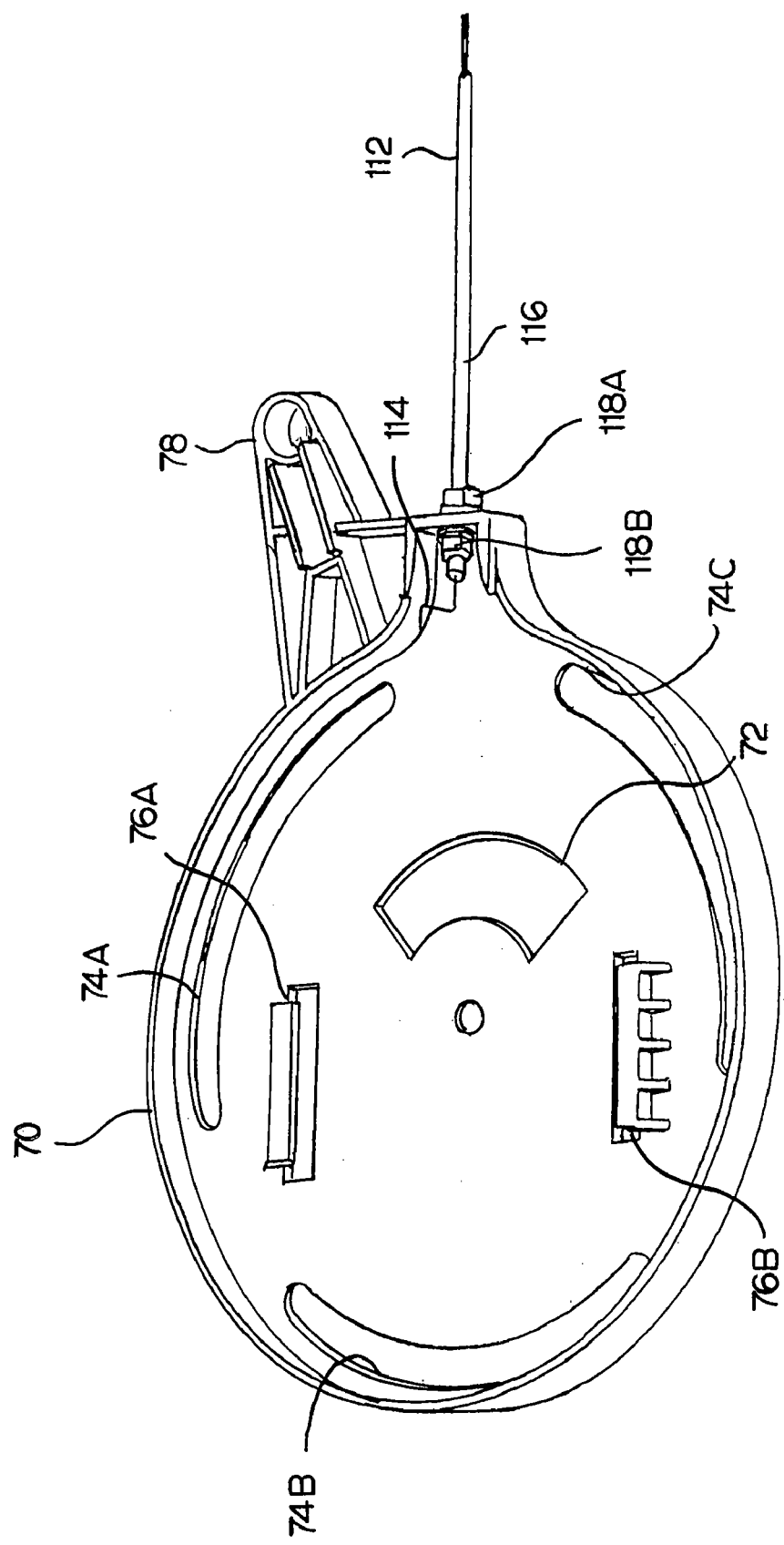
FIG. 6 is a perspective view of the intermediate (or rotating) plate of the directional control assembly of FIGS. 2–4.

FIG. 6 is a perspective view of the intermediate plate 70 of the directional control assembly 40. As shown, there is an arc-shaped opening 72 also defined through this plate 70. However, this opening 72 is an approximately 90° arc, as compared to the 180° arc of the opening 52 defined through the upper plate 50 and described above with reference to FIG. 5. As also shown, there are three additional arc-shaped openings 74A, 74B, 74C at spaced intervals along the periphery of the intermediate plate 70, the importance of which will be described below. Lastly, there are two slots 76A, 76B defined along the bottom surface of the intermediate plate 70, the importance of which will also be described below.

Figure 7:
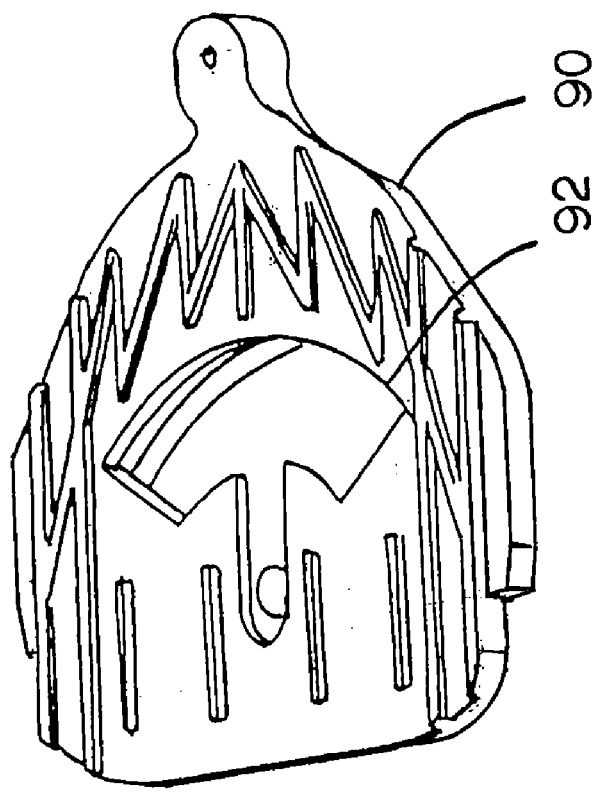
FIG. 7 is a perspective view of the lower (or shutter) plate of the directional control assembly of FIGS. 2–4.

FIG. 7 is a perspective view of the lower plate 90 of the directional control assembly 40, which includes an arc-shaped opening 92 defined therethrough, the importance of which will also be described below.

Figure 8:
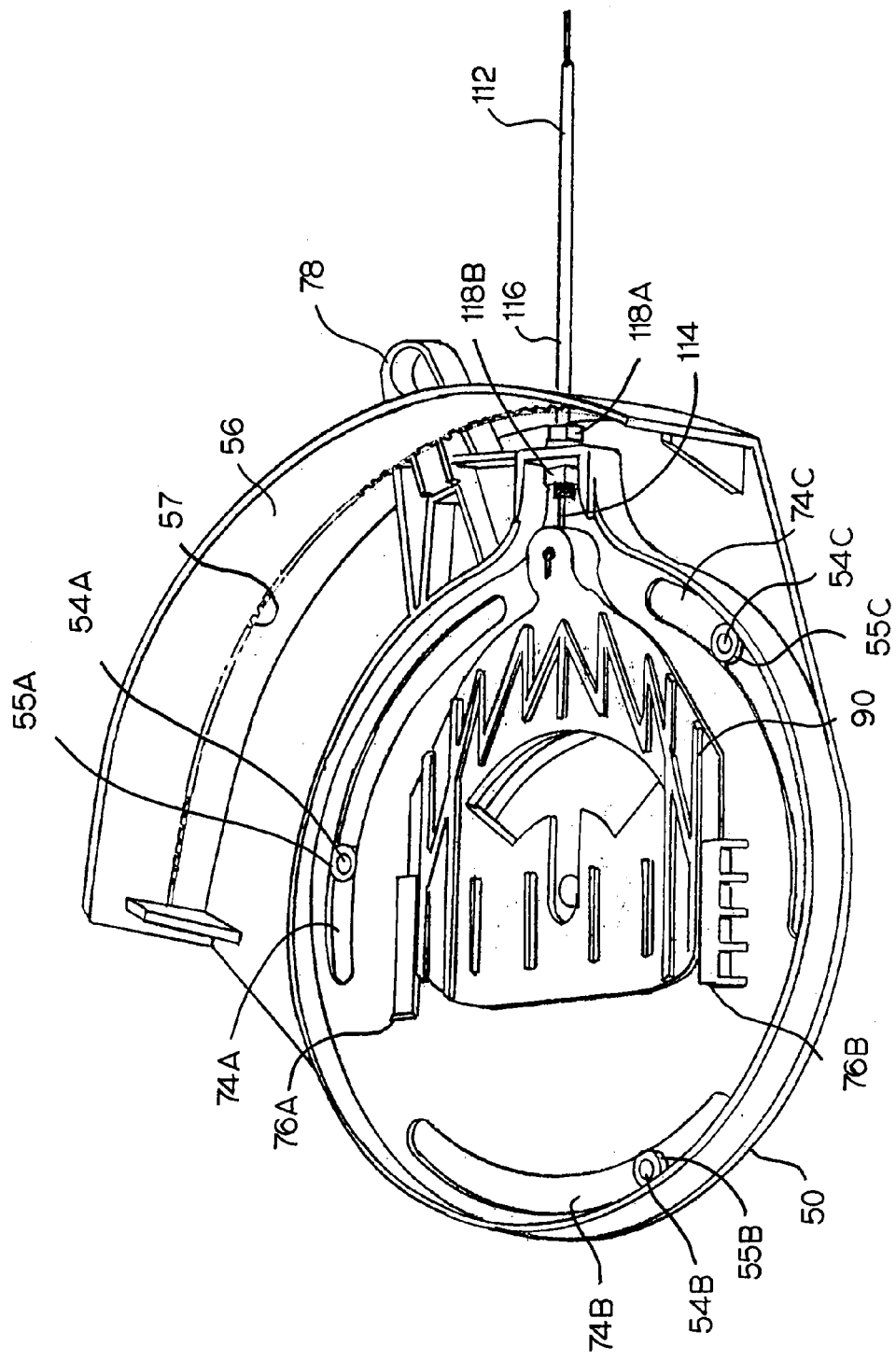
FIG. 8 is a perspective view of the assembled directional control assembly of the exemplary broadcast spreader of FIG. 1.
Figure 9A:
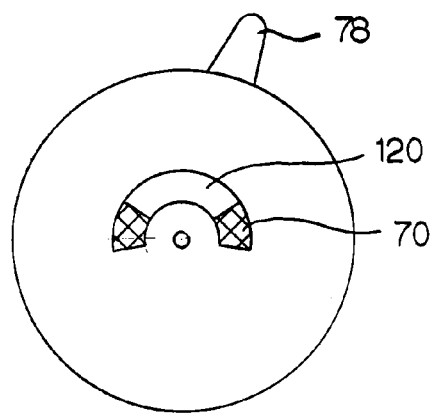
FIGS. 9A–9C are schematic views looking into the hopper of the exemplary broadcast spreader of FIG. 1 and illustrating various positions of the directional control assembly to alter the direction of the distribution pattern.
Figure 9B:
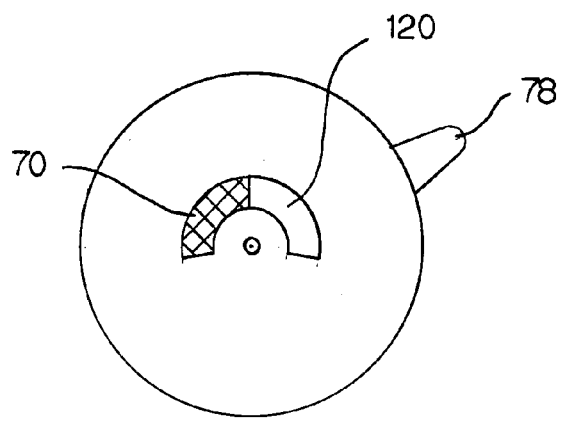
Figure 9C:
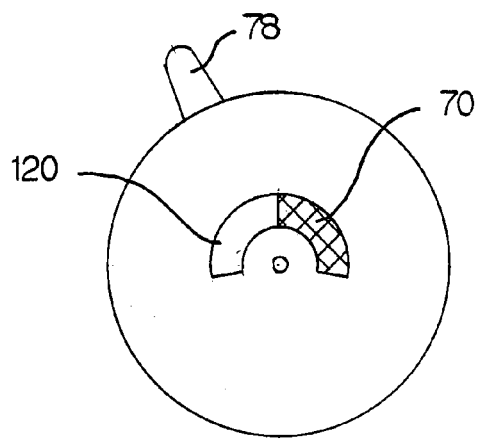

FIG. 8 illustrates the assembly of the upper plate 50, the intermediate plate 70, and the lower plate 90 to one another. As shown in FIG. 8, when the intermediate plate 70 is positioned adjacent the bottom surface of the upper plate 50, the bosses 55A, 55B, 55C extending from the bottom surface of the upper plate 50 extend through and are received in the three arc-shaped openings 74A, 74B, 74C defined through and along the periphery of the intermediate plate 70. Then, as shown in FIG. 4, screws or similar fasteners 100A, 100B, 100C can be used to secure the intermediate plate 70 and the upper plate 50 to each other and to the underside of the hopper 12 (as shown in FIGS. 1 and 2). In this regard, washers 102A, 102B, 102C are preferably used in combination with the screws or similar fasteners 100A, 100B, 100C, with the washers 102A, 102B, 102C having an outer diameter greater than the width of the arc-shaped openings 74A, 74B, 74C to secure the intermediate plate 70 relative to the upper plate 50.

However, because of the arc-shaped openings 74A, 74B, 74C, the intermediate plate 70 can still be rotated relative to the upper plate 50, and thus, the hopper 12 of the broadcast spreader 12. In this regard, the intermediate plate 70 preferably includes an integral handle 78 that extends through the opening 57 defined through the deflector 56 of the upper plate 50, a handle 78 that that can be grasped and manipulated by the user to effectuate rotation of the intermediate plate 70 relative to the upper plate 50.

Returning to FIG. 8, the lower plate 90 of the directional control assembly 40 is then received and secured in the two slots 76A, 76B defined along the bottom surface of the intermediate plate 70. In this position, the lower plate 90 rotates with the intermediate plate 70. However, this lower plate 90 can also be independently advanced forwardly and rearwardly in the slots 76A, 76B to act as a shutter, opening and closing the pathway from the discharge port of the hopper 12 to the rotating fan 30 (as shown in FIG. 1) as the arc-shaped opening 92 defined through the lower plate 90 is moved relative to the arc-shaped opening 72 defined through the intermediate plate 70, thus regulating the flow of material.

In this exemplary embodiment, and as best shown in FIGS. 2 and 3, an actuator lever 110 is used in combination with a control cable 112 to adjust the forward/rearward positioning of the lower plate 90 relative to the intermediate plate 70. Specifically, manipulation of the actuator lever 110 causes the movement of an internal wire 114 of the control cable 112 relative to an external conduit 116. Since the internal wire 114 is secured to the lower plate 70 (as best shown in FIG. 8), such movement of the internal wire 114 of the control cable 112 either pulls the lower plate 90 forward relative to the intermediate plate 70 or pushes the lower plate 90 rearward relative to the intermediate plate 70. In this regard, the position of the external conduit 116 of the control cable 112 is fixed relative to the directional control assembly 40 by respective washer and nut assemblies 118A, 118B, which secure the threaded distal end of the external conduit 116 to the intermediate plate 70, as shown in FIGS. 2, 3 and 8. Of course, various other actuators could be used to effectuate the forward and rearward movement of the lower plate 90 relative to the intermediate plate 70 without departing from the spirit and scope of the present invention.

In operation, the construction of the directional control assembly 40 thus not only provides for control of the flow of material to the fan 30, but also allows for the shifting of the entire distribution pattern from side to side without adversely affecting the distribution pattern. Specifically, the intermediate plate 70 (along with the lower plate 90) is designed for rotation about an axis that is common to the axis about which the shaft of the fan 30 rotates. Therefore, as the intermediate plate 70 (and lower plate 90) is rotated relative to the upper plate 50 and the hopper 12, granular material continues to contact the same annular "band" on the rotating fan 30, but that the annular band is shifted from side to side, i.e., it is rotated clockwise or counterclockwise about the common axis of rotation. For example, FIG. 9A is a schematic view looking into the hopper 12 and illustrating the intermediate plate 70 in a centered position such that the opening 120 through which the granular material passes to the fan 30 (as shown in FIG. 1) is centered. In FIG. 9B, the opening 120 has been rotated clockwise, whereas in FIG. 9C, the opening 120 has been rotated counterclockwise. Accordingly, the direction of the distribution pattern can be altered without changing the rate of flow of material from the hopper 12 or otherwise adversely affecting the distribution pattern. By allowing for such directional control, an operator can make adjustments to account for the speed of the tractor and/or other factors that may affect the distribution pattern. Of course, while making such adjustments, the operator can also adjust the forward/rearward positioning of the lower plate 90 relative to the intermediate plate 70, thus regulating the flow of material.

Furthermore, it should be recognized that the essential function of the present invention can also be accomplished with a directional control assembly that includes only the intermediate plate 70 and the lower plate 90. In this regard, the primary function of upper plate 50 is to interface with the discharge port of the hopper 12 and to facilitate the rotation of the intermediate plate 70 relative to the hopper 12. However, if the hopper 12 is provided with an appropriately sized discharge port, it is contemplated that the intermediate plate 50 could be directly secured to the underside of the hopper 12 in a manner that allows for the rotation of the intermediate plate 70 relative to the hopper 12, thus eliminating the need for the upper plate 50.

One of ordinary skill in the art will also recognize that additional configurations are also possible without departing from the teachings of the present invention or the scope of the claims which follow. This detailed description, and particularly the specific details of the exemplary embodiments disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A broadcast spreader with directional control, comprising:

a hopper adapted to store granular particles and including a discharge port through a surface thereof;

a fan rotating about an axis for distributing the granular particles passing from the hopper through the discharge port in a predetermined distribution pattern;

a rotating plate that is secured to and adapted for rotation with respect to the hopper, said rotating plate defining an opening therethrough that is substantially in registry with but smaller than the discharge port, thus serving to define a pathway for the granular material from the hopper through the discharge port and onto the fan, wherein rotation of the rotating plate relative to the hopper causes a clockwise or counterclockwise shifting of the pathway for the granular material, thus altering the direction of the predetermined distribution pattern; and a shutter plate that is secured to and adapted for slidable movement with respect to the rotating plate, such slidable movement of the shutter plate relative to the rotating plate regulating flow of granular material from the hopper, through the discharge port and the opening defined through the rotating plate, and onto the fan.

2. The broadcast spreader as recited in claim 1, wherein said rotating plate is adapted for rotation with respect to the hopper about an axis common with the axis about which the fan rotates.

3. The broadcast spreader as recited in claim 1, and further comprising an actuator lever and control cable for effectuating the slidable movement of the shutter plate with respect to the rotating plate to regulate flow of granular material from the hopper, through the discharge port and the opening defined through the rotating plate, and onto the fan.

4. A broadcast spreader with directional control, comprising:

a hopper adapted to store granular particles and including a discharge port through a surface thereof;

a fan rotating about an axis for distributing the granular particles passing from the hopper through the discharge port in a predetermined distribution pattern;

a rotating plate that is secured to and adapted for rotation with respect to the hopper, said rotating plate defining an opening therethrough that is substantially in registry with but smaller than the discharge port, thus serving to define a pathway for the granular material from the hopper through the discharge port and onto the fan, wherein rotation of the rotating plate relative to the hopper causes a clockwise or counterclockwise shifting of the pathway for the granular material, thus altering the direction of the predetermined distribution pattern;

a means for opening and closing the pathway for the granular material from the hopper through the discharge port and onto the fan; and an upper plate interposed between the hopper and said rotating plate, said upper plate defining an opening therethrough which is substantially in registry with the discharge port and the opening defined through said rotating plate, said rotating plate being adapted for rotation with respect to the upper plate and the hopper.

5. The broadcast spreader as recited in claim 4, wherein the opening defined through said rotating plate is substantially smaller than the opening defined through said upper plate.

6. The broadcast spreader as recited in claim 5, wherein the opening defined through said upper plate is an arc-shaped opening spanning approximately 180°, and wherein the opening defined through said rotating plate is an arc-shaped opening spanning approximately 90°.

7. In a broadcast spreader having a hopper adapted to store granular particles and a fan rotating about an axis for distributing the granular particles passing from the hopper through a discharge port, the improvement comprising a directional control assembly, including:
　a first plate that is secured to and adapted for rotation with respect to the hopper about an axis common with the axis about which the fan rotates, said first plate defining an opening therethrough, said opening being substantially in registry with but smaller than the discharge port and thus serving to define a pathway for the granular material from the hopper through the discharge port and onto the fan, resulting in the distribution of the granular material in a predetermined distribution pattern, wherein rotation of the first plate relative to the hopper causes a clockwise or counterclockwise shifting of the pathway for the granular material, thus altering the direction of the predetermined distribution pattern; and
　a second plate that is secured to and adapted for slidable movement with respect to the first plate, such slidable movement of the second plate relative to the first plate regulating flow of granular material from the hopper, through the first plate, and onto the fan.

8. The broadcast spreader as recited in claim 7, and further comprising a third plate interposed between the hopper and said first plate, said third plate defining an opening therethrough which is substantially in registry with the discharge port and the opening defined through said first plate, said first plate being adapted for rotation with respect to the third plate and the hopper.

9. The broadcast spreader as recited in claim 7, and further comprising an actuator lever and control cable for effectuating the slidable movement of the second plate with respect to the first plate to regulate flow of granular material from the hopper, through the first plate, and onto the fan.

10. A directional control assembly for a broadcast spreader having a hopper adapted to store granular particles and a fan rotating about an axis for distributing the granular particles passing from the hopper through a discharge port, comprising:
　an upper plate secured to a bottom surface of said hopper, said upper plate defining an opening therethrough that is substantially in registry with the discharge port;
　an intermediate plate that is secured to and adapted for rotation with respect to the upper plate and the hopper about an axis common with the axis about which the fan rotates, said intermediate plate defining an opening therethrough that is substantially in registry with but smaller than the opening defined through the upper plate, thus serving to define a pathway for the granular material from the hopper, through the discharge port and upper plate, and onto the fan, resulting in the distribution of the granular material in a predetermined distribution pattern, wherein rotation of the intermediate plate relative to the upper plate causes a clockwise or counterclockwise shifting of the pathway for the granular material, and thus altering the direction of the predetermined distribution pattern; and
　a lower plate that is secured to and adapted for slidable movement with respect to the intermediate plate, such slidable movement of the lower plate relative to the intermediate plate regulating flow of granular material from the hopper, through the upper and intermediate plates, and onto the fan.

11. The directional control assembly for a broadcast spreader as recited in claim 10, and further comprising an actuator lever and control cable for effectuating the slidable movement of the lower plate with respect to the intermediate plate to regulate flow of granular material from the hopper, through the upper and intermediate plates, and onto the fan.

12. The directional control assembly for a broadcast spreader as recited in claim 10, wherein the opening defined through said intermediate plate is substantially smaller than the opening defined through the upper plate.

13. The directional control assembly for a broadcast spreader as recited in claim 12, wherein the opening defined through said upper plate is an arc-shaped opening spanning approximately 180°, and wherein the opening defined through said intermediate plate is an arc-shaped opening spanning approximately 90°.

* * * * *